United States Patent [19]
Torp et al.

[11] Patent Number: 5,662,115
[45] Date of Patent: Sep. 2, 1997

[54] METHOD FOR DETERMINING THE VELOCITY-TIME SPECTRUM OF BLOOD FLOW

[75] Inventors: Hans Torp, Trondheim; Kjell Kristoffersen, Oslo, both of Norway

[73] Assignee: Vingmed Sound A/S, Horten, Norway

[21] Appl. No.: 479,528

[22] Filed: Jun. 7, 1995

[30] Foreign Application Priority Data

Jun. 14, 1994 [NO] Norway ................................. 94.2222

[51] Int. Cl.$^6$ .......................................................... A61B 8/06
[52] U.S. Cl. .......................................................... 128/661.09
[58] Field of Search .................. 128/661.08, 661.09, 128/661.1, 662.04

[56] References Cited

U.S. PATENT DOCUMENTS

| | | | |
|---|---|---|---|
| 4,485,821 | 12/1984 | Iinuma | 73/861.25 X |
| 4,930,513 | 6/1990 | Mayo et al. | 128/661.09 |
| 5,058,594 | 10/1991 | Lazenby | 128/661.08 |
| 5,127,409 | 7/1992 | Daigle | 128/660.07 |
| 5,305,753 | 4/1994 | Wilson | 128/661.08 |
| 5,320,105 | 6/1994 | Bonnefous et al. | 128/661.09 X |
| 5,363,851 | 11/1994 | Hall et al. | 128/661.09 |
| 5,462,059 | 10/1995 | Fewara et al. | 128/661.09 |
| 5,544,658 | 8/1996 | Kim et al. | 128/661.09 |
| 5,560,363 | 10/1996 | Torp et al. | 128/661.09 |

OTHER PUBLICATIONS

Bonnefous & Pesque, "Time Domain Formulation of Pulse-–Doppler Ultrasound and Blood Velocity Estimation by Cross–Correlation" *Ultrason. Imaging 8*, vol. 8, pp. 73–85, 1986.

Ferrara & Algazi, "A New Wideband Spread Target Maximum Likelihood Estimator for Blood Velocity Estimation—Part I: Theory; Part II: Evaluation of Estimators with Experimental Data", *IEEE Trans. Ultrason. Ferroelec. and Freq. Contr.*, vol. UFFCC–38, pp. 1–26, 1991.

Ferrara, et al., "The Effect of Frequency Dependent Scattering and Attenuation on the Estimation of Blood Velocity Using Ultrasound", *IEEE Trans. Ultrason. Ferroelec. and Freq. Contr.*, vol. UFFC–39, pp. 754–767, 1992.

Seitz, Peter, "Optical Superresolution Using Solid State Cameras and Digital Signal Processing", *Optical Engineering* 27(7) Jul. 1988, pp. 535–540.

*Primary Examiner*—Francis Jaworski
*Attorney, Agent, or Firm*—Rothwell, Figg, Ernst & Kurz

[57] ABSTRACT

Method for determining the velocity-time spectrum of blood flow in a living body by means of an ultrasonic pulsed wave Doppler system, comprising:

sequential transmission of pulsed ultrasonic waves and receiving a corresponding sequence of echo signals, sampling the received echo signals at one or more predetermined time delays after transmitted ultrasonic pulses, and processing said sequence of echo signal samples by frequency spectrum analysis to obtain a blood velocity spectrum comprising a number of velocity components within a range of expected blood velocity values, and repeating said processing a plurality of times to obtain a velocity-time spectrum for substantially real-time display.

For each velocity component in said blood velocity spectrum the received echo signals are sampled with subsequent increase or decrease in said predetermined delay after pulse transmission according to the change in round-trip time of the ultrasonic pulses reflected from blood moving with a velocity corresponding to each said velocity component. The resulting sequence of signal samples is processed to obtain said velocity component.

7 Claims, 3 Drawing Sheets

METHOD FOR DETERMINING THE VELOCITY-TIME SPECTRUM OF BLOOD FLOW

BACKGROUND OF THE INVENTION

The present invention relates to ultrasonic diagnostic system which measure the flow of fluids through Doppler interrogation, and more particularly to signal processing algorithms and display of a velocity-time spectrum calculated from multi-gated Doppler signal samples. The invention makes it possible to measure and visualize the blood flow velocity distribution over a wide velocity range in real time with spatial resolution along the ultrasonic beam. This may be referred to as velocity matched spectrum analysis or a new method for resolving velocity ambiguity in ultrasonic blood flow velocity sonograms.

Spectrum sonogram analysis based on the well known modified periodogram method has been the most commonly used method for display of velocity-time wave forms in ultrasound Doppler blood flow measurements. Moderate frequency aliasing can be compensated for by baseline shifting when the maximum frequency shift is lower than two times the Nyquist limit. In principle, a smoothly varying velocity curve can be followed through several "wrap-arounds" by stacking several equal sonograms at the top of each other. This method is described for example in U.S. Pat. No. 4,485,821. Two factors limit the use of this technique:
1. The highpass filter used for clutter rejection blanks out parts of the aliased spectrum in an area close to each multiple of the sampling frequency.
2. The transit-time effect due to finite pulse length increases the spectral bandwidth and destroys the spectral envelope when high velocities are present.

Several different methods have been proposed for resolving velocity ambiguity.

Time delay estimation from pulse to pulse by cross correlation technique was applied to ultrasound color flow imaging by Bonnefous and Pesqué, "Time domain formulation of Pulse-Doppler Ultrasound and Blood Velocity Estimation by Cross-Correlation,". Ultrason. Imaging 8, Vol. 8, pp.73–85, 1986.

Another approach was used by Ferrara & Algazi: "A new wideband spread target maximum likelihood estimator for blood velocity estimation—Part I: Theory" IEEE Trans. Ultrason. Ferroelec. and Freq. contr., vol. UFFC-38, pp. 1–26, 1991; and "The Effect of Frequency Dependent Scattering and Attenuation on the Estimation of Blood Velocity Using Ultrasound" IEEE Trans. Ultrason. Ferroelec. and Freq. contr., vol. UFFC-39, pp.754–767, 1992. From a stochastic model of the signal from a point scatterer, a maximum likelihood estimate for the velocity was derived, and results were shown for measurement of the velocity profile in a tube with steady state flow. A similar method based on two-dimensional Fourier transform has been proposed, where a velocity spectrum was obtained by summation along straight lines in the 2D Fourier plane. This method is described in U.S. Pat. No. 4,930,513, referred to as "radial projection in the 2D Fourier plane".

SUMMARY OF THE INVENTION

The presented method comprises a similar projection in the time domain, giving a velocity spectrum which is displayed in shades of gray or color as a function of time, in the same way as conventional Doppler spectrum sonograms. In this way velocity wave forms with severe aliasing can be vizualized.

Compared to previously described methods this invention involves differences which can be further explained as follows:

In conventional Doppler spectrum analysis, all velocity components are calculated from a sequence of signal samples, all originating from the same range gate, i.e. sampled with the same delay after pulse transmission. In contrast the present invention uses signal samples with different delay to track the movement of the blood cell scatterers, according to the expected velocity. In this way the correlation length of the signal component arising from a specific velocity, increases when there is a match between the actual and the expected velocity. This makes the spectral envelope to appear more distinct in the spectrum-time display. This method is in the following referred to as "Velocity matched spectrum analysis", and abbreviated "VM-spectrum".

Ferrara & Algazi as referred to above describe a maximum likelihood method for blood flow measurements. The velocity likelihood function used in their method is similar to the the VM-spectrum, but their algorithm is more complicated, including a "matched filter" for the pulse envelope. The possibility of using the velocity likelihood function described by Ferrara & Algazi for velocity spectrum display is not mentioned in their publications.

A related method for velocity spectrum estimation is described in U.S. Pat. No. 4,930,513, referred to above. This method comprises a two-dimensional Fourier transform applied to a sequence of multi-gated signal samples, followed by a "radial projection" operation. It can be shown that these two operations give similar result as the proposed VM spectrum algorithm. However, the VM-spectrum algorithm requires much less computation power, and no special precautions are necessary when the velocity exceeds the Nyquist limit.

The presented method can be implemented directly to the received ultrasound echo signals (RF-domain), or to the quadrature components after complex demodulation The performance of the VM-spectrum can be further improved by
1. Using a smooth window function in order to reduce side lobes in the spectrum.
2. Applying spatial and/or temporal averaging, in order to reduce variance in the spectral estimates.

Stationary and slowly moving tissue structures in the body give strong low frequency components in the Doppler signal. These components are usually suppressed with a highpass filter, which as a side effect removes the signal from slowly moving blood. Since the velocity components are separated in the spectral display, it is not necessary to remove all low frequency components in the signal, but a certain attenuation is required to prevent leakage to other spectral components (ref. spectrum analysis and window functions). The VM-spectrum algorithm is more sensitive to spectral leakage from low frequency components, than conventional spectrum analysis methods. Therefore a highpass filter with higher cutoff frequency is provided. In order to measure both high and low velocity components from the same signal, two or more highpass filters with different cutoff frequencies may be used in parallel. The low velocity part of the spectrum is calculated using a low cutoff frequency. The higher velocity components are calculated using a high cutoff frequency, preferably using the VM-spectrum algorithm.

On the background of prior art as discussed above the present invention is directed to a method for calculation and display of the axial velocity distribution in blood flow. A velocity spectrum is calculated from the received signal of a multi-gated ultrasonic Doppler instrument.

More definite statements of the novel and specific features of the method according to this invention, are found in the accompanying claims.

BRIEF DESCRIPTION OF THE DRAWINGS

The invention will be further explained below with reference to exemplary embodiments illustrated in the drawings, in which:

FIG. 2.

DETAILED DESCRIPTION OF THE PREFERRED EMBODIMENTS

Figure 1:
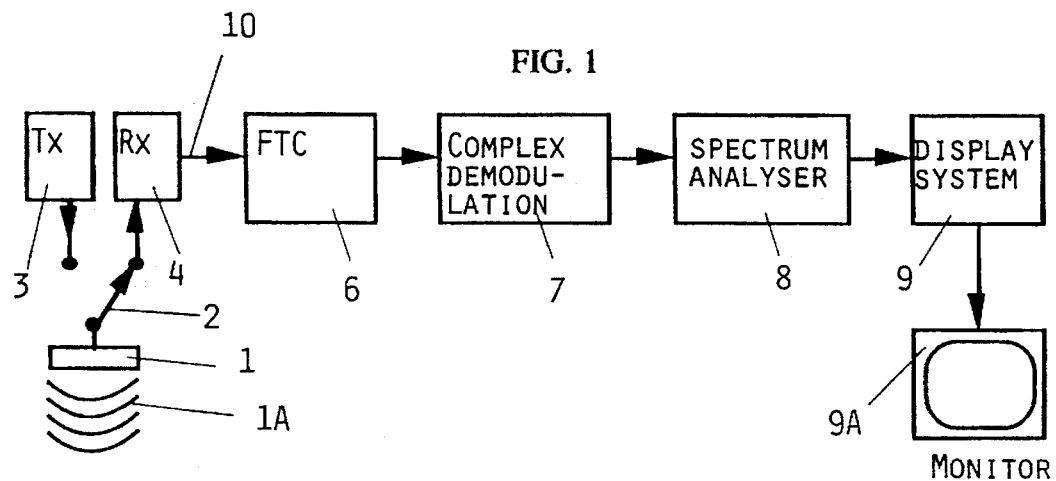
FIG. 1 is an example of a schematic block diagram generally illustrating the main features and functions involved in a complete apparatus for ultrasound Doppler blood flow measurement, in which the method according to the invention can be implemented.

A block diagram for an ultrasonic Doppler blood flow velocity measurement system where the invention is incorporated, is shown in FIG. 1. Usually, the blood flow measurement system is combined with an ultrasonic imaging system utilizing the same transducer, but the invention is also applicable in "stand-alone" Doppler systems. An ultrasonic transducer 1 emits a pulsed ultrasonic beam 1A into the living body concerned. The ultrasonic pulses are back-scattered from structures in the body, like blood, to produce echoes which returns to and are detected by the transducer 1, see FIG. 1.

The functional blocks illustrated in FIG. 1 comprise a transmitter circuit 3 and a receiver circuit 4 which by means of a switch 2 is connected to the transducer 1 for ultrasonic emission and echo reception respectively. From receiver 4 an arrow 10 indicates the further processing of the echo signal received, first in an optional FTC stage to be explained further below, complex demodulation 7, spectrum analysis 8 and display 9 with monitor 9A.

The echo from a scatterer in a distance r from the transducer 1 will be detected with a delay t=2 r/c after pulse transmission, which corresponds to the round-trip time for the ultrasonic pulse to propagate from the transducer to the scatterer and back. The constant c is the speed of sound in human tissue. The received RF (radio frequency) echo signal from pulse number k is denoted s(t,k), where t is the elapsed time after pulse transmission.

For the explanations below the following list of symbols used, may be helpful.

Nomenclature:

| | |
|---|---|
| x(t,k) | Complex demodulated Doppler signal, |
| t | elapsed time after pulse transmission |
| k | pulse number |
| s(t,k) | = re{x(t,k) exp i$\omega_0$t} is the corresponding RF-signal |
| $f_0$ | Quadrature demodulation mixer frequency Typical values: 2 MHz–20 MHz |
| $\omega_0$ | = $2\pi f_0$, Quadrature demodulation angular mixer frequency |
| $T_r$ | Time increment in radial (depth range) direction. Typical values $1/8f_0 < T_r < 1/f_0$ |
| T | Pulse repetition time. Typical values: 10 μs < T < 1000 μs |
| c | speed of sound in blood, ~ 1570 m/sec |
| $V_{min}$, $V_{max}$ | Blood velocity lower and upper bound to be measured (specified by the operator) |
| $V_{Nyquist}$ | Nyquist velocity, i.e. the blood velocity which gives a Doppler shift equal to half the sampling frequency (= 1/T) |
| N | Window length (in number of samples). Typical values 16 < N < 256. |
| w(k) | Smooth window function of length N (e.g. Hamming window, rectangular window), which is symmetric around k = 0 when |k| > N/2 |
| M | Number of spectral components to be calculated. |

A scatterer moving with a velocity component v along the ultrasonic beam, will cause a change in the round-trip time from one pulse to the next according to $$\Delta t = 2vT/c \qquad (1)$$

Figure 3:
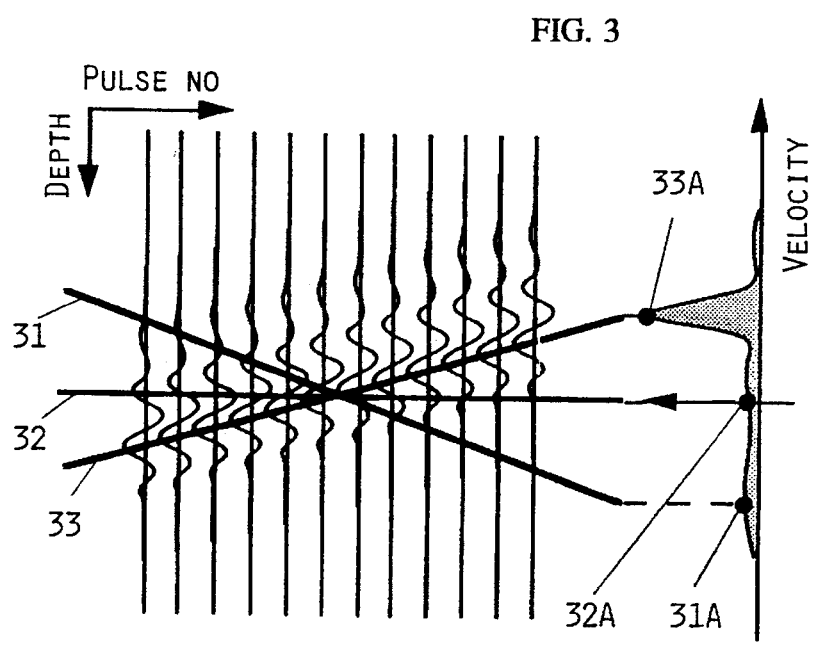
FIG. 3 is a pulse-depth diagram showing the principle of calculating the velocity spectrum components, according to the invention, FIG. 4 (A/B) shows (A) the received signal pulses in a time depth display, and (B) an associated time-velocity sonogram, the latter being a visual representation of the kind desired according to this invention.
Figure 4:
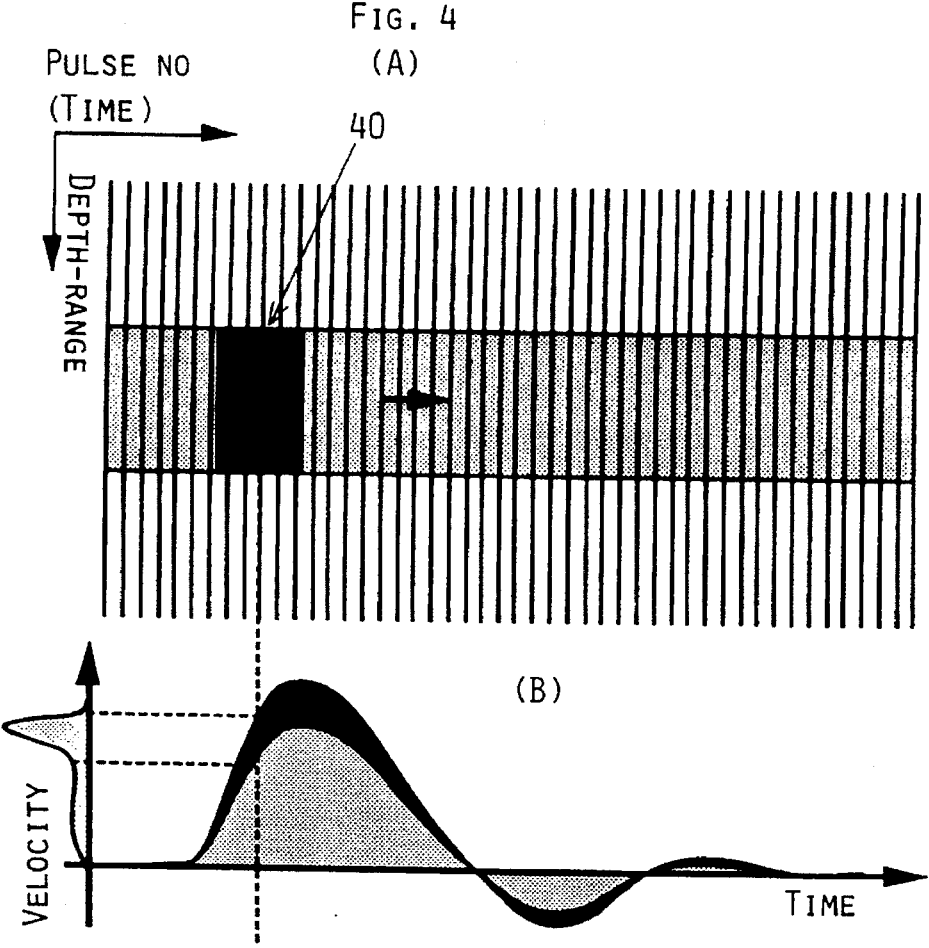

By sampling the received echo signals with subsequently change $\Delta t$ in delay after pulse transmission, and forming the sum of these samples over a number N of consecutive pulses, a velocity spectrum line can be calculated according to $$S''(v; t_0, k_0) = \left| \sum_k W_N(k) s\left( t_0 + k\frac{2vT}{c}, k_0 + k \right) \right|^2 \qquad (2)$$

where $W_N(k)$ is a smooth window function of length N (e.g. Hamming window, rectangular window). This process can be repeated (using the same set of N echo signals) for a number of different velocity values v to obtain a velocity spectrum. This principle is illustrated in FIG. 3 (see also FIG. 4). The components in the velocity spectrum are calculated by adding the RF signal along skewed lines as for example shown at 31, 32 and 33 according to the velocity of the targets. Here calculation of three different spectral components is shown, giving three values indicated at 31A, 32A and 33A respectively, in the velocity spectrum. In a practical implementation the received RF (radio frequency) echo signals from the N consecutive transmitted pulses are sampled at a number of predetermined delays after pulse transmission, digitized and stored in digital memory before processing of (2). The signal at time $t=t_0+k\Delta t$ can then be obtained by selecting the stored signal sample closest in time, or by interpolation between the stored signal samples.

The velocity spectrum can also be computed from the complex envelope of the echo signals, rather than from the RF signals. The complex envelope, consisting of two quadrature components forming a complex signal, can be obtained from the digital RF samples using well known digital filtering techniques (digital complex demodulation), or the complex envelope signal can be sampled by using an analog complex demodulator (as illustrated with block 7 in FIG. 1). The velocity spectrum is calculated from the complex envelope x(t,k) according to $$S''(v; t_0, k_0) = \left| \sum_k W_N(k) x \left( t_0 + k \frac{2vT}{c}, k_0 + k \right) e^{jk\omega_0 2vT/c} \right|^2 \quad (3)$$

In order to reduce the variance in the spectrum estimate, temporal (pulse to pulse) and spatial (along the ultrasonic beam) averaging of the raw velocity spectrum estimate is performed:

$$S(v) = g(v) \frac{1}{N_a} \sum_{k,l} S''(v; t_0 + lT_r, k_0 + k) \quad (4)$$

Figure 6:
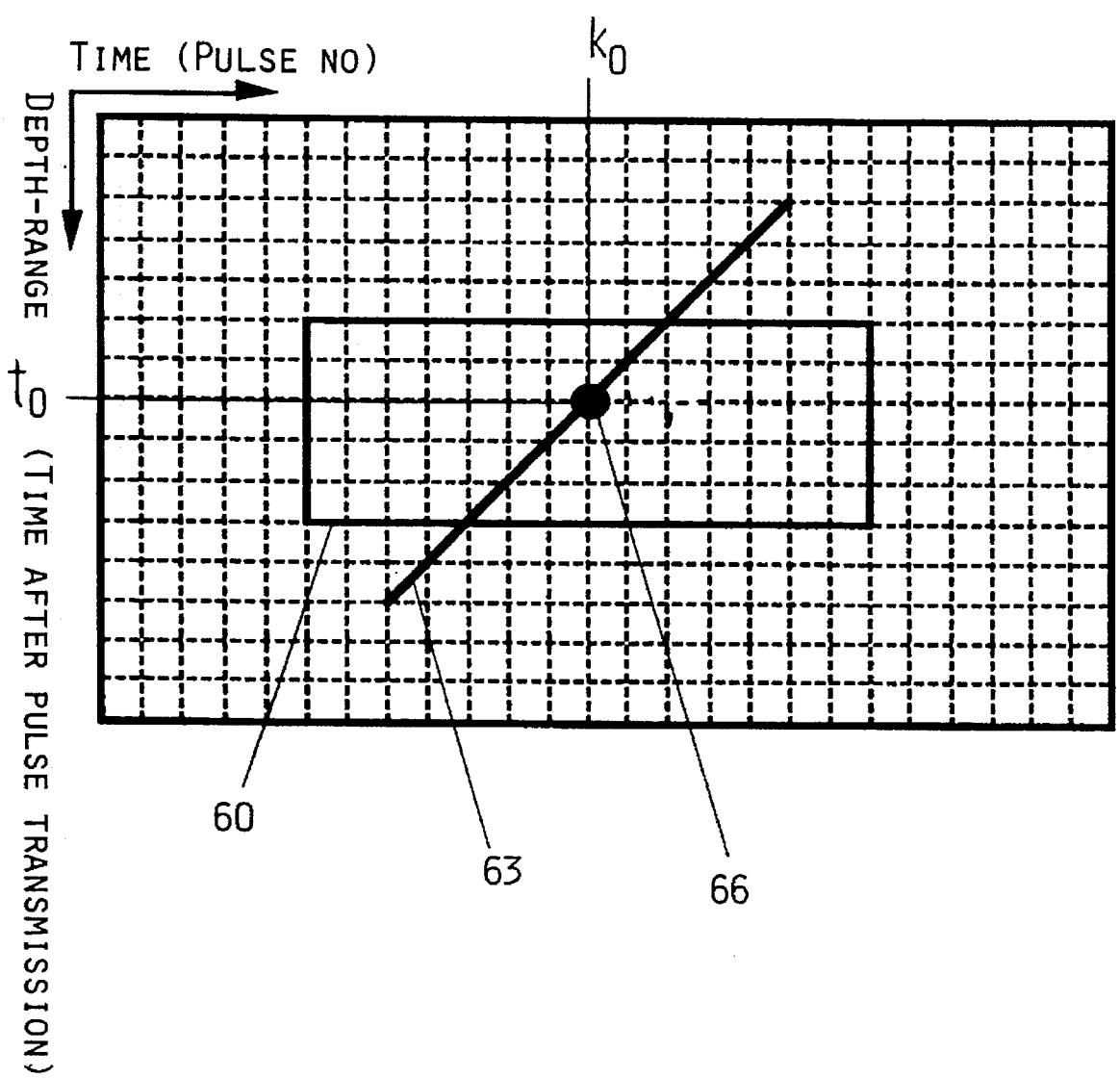
FIG. 6 is a magnified time-depth diagram of the echo samples used to calculate the spectrum at one time instant, cf.

$N_a$ is the number of points in the averaging region, which according to FIG. 6 can be a rectangular region 60 centered around the point 66 ($t_0$, $k_0$). Thus, the raw spectrum estimate $S(v,t_0,k_0)$ is calculated from the signal samples along the skewed line 63 through ($t_0,k_0$). These estimates are averaged for all points inside the rectangle 60. The quantity g(v) is a velocity dependent gain factor which compensates for the loss in signal power close to each multiples of the sampling frequency due to the wall motion rejection filter (high pass filter).

The resulting velocity spectral components s(v) are calculated for a discrete number of velocities $$\{v_{min}=v_1<v_2<\ldots<v_M=v_{max}\}, \quad (25)$$

giving a velocity spectral distribution (or shorter: velocity spectrum) calculated from signal samples in a neighborhood of ($t_0$, $k_0$).

$$Ps(t_0, k_0) = (S(v_1), S(v_2), \ldots, S(v_M))$$

Each component in the velocity spectrum is real valued and positive. Both the velocity span ($v_{min}$, $v_{max}$), and the number of spectral components M is variable over a wide range, adapted to the clinical situation, and the velocity resolution of the Doppler system. Typical values: N=64 ... 256, $v_{max}$=0.1 ... 6.0 m/sec. The velocities $\{v_1,v_2,\ldots\}$ may be distributed uniformly over the velocity range, or with a higher density close to v=0 m/sec.

The velocity spectrum Ps($r_0,t_0$) is calculated for a number of different time instants $t_0$, uniformly distributed, with temporal increment typically in the range 1 msec–20 msec. The spectral components are converted to gray or color scale pixels, and showed in a graphic display, after interpolation to match the screen resolution. An example of such a time-velocity sonogram display is given in FIG. 4(B), resulting from the received echo signal due to consecutive ultrasonic pulses as illustrated in FIG. 4(A). Thus, the darkest hatched area 40 in FIG. 4A corresponds to the signal illustrated in FIG. 3. As indicated with the arrow in FIG. 4A the area 40 is successively moved so as to calculate the velocity spectrum at different instants of time.

Figure 2:
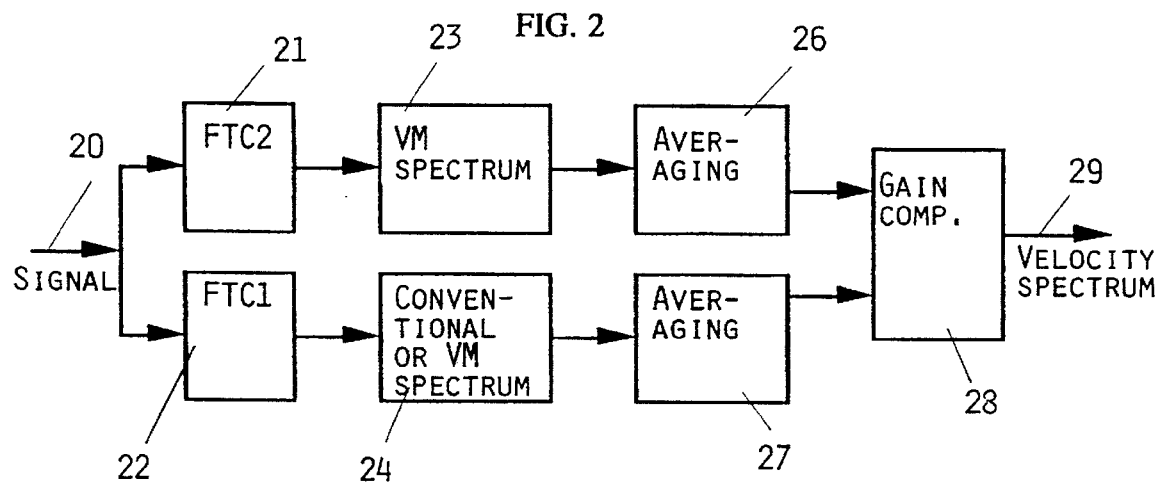
FIG. 2 is a more detailed block diagram on the functional parts of the velocity spectrum analyser, which is a part of the complete diagram in FIG. 1.
Figure 5:
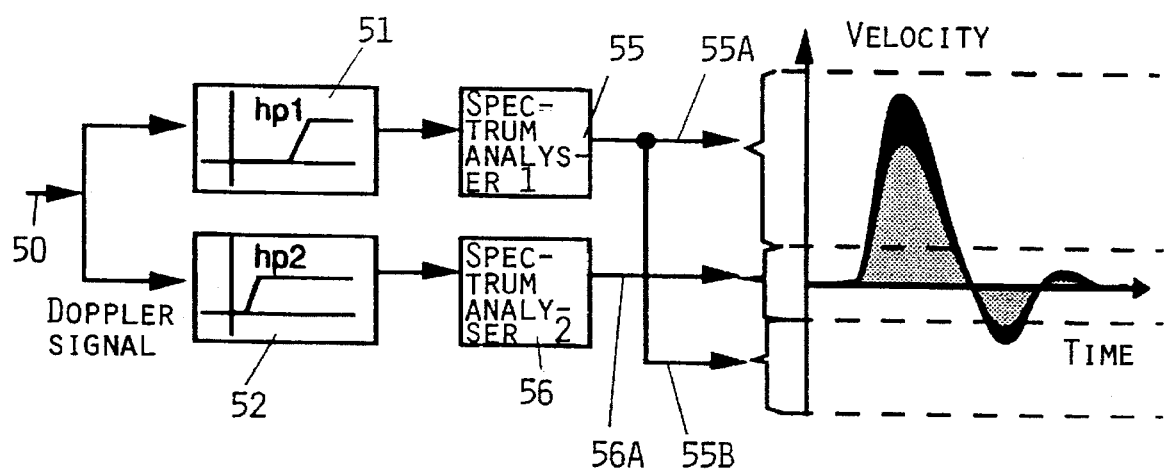
FIG. 5 shows the use of two different high pass filter for separate parts of the velocity spectrum.

The received signal includes clutter echoes from fixed and slowly moving targets like vessel walls, heart valves etc. These are suppressed in the FTC (Fixed Target Canceller)-stage in FIG. 1 (and FIG. 2). Such FTC stages remove signal components with zero and low frequency Doppler shift. The FTC processing can be applied before and/or after the complex demodulation stage. In FIG. 1 and FIG. 2 a multi-stage FTC is shown. The first stage in FIG. 1 is included to limit the dynamic range of the signal. In FIG. 2, two FTC filters 21, 22 are run in parallel, one for the low velocity part, and one for the high velocity part of the spectrum, as shown more particularly in FIG. 5. Thus, for the Doppler input signal indicated at 50 in FIG. 5, there are provided two parallel high pass filter circuits 51 and 52, each followed by a spectrum analyzer 55 and 56 respectively, with arrows 55A, 55B and 56A indicating how the low velocity part and the high velocity part in the associated time-velocity spectrum, are calculated. In this way the FTC-filter frequency response can be optimized separately for the two individual parts of the velocity spectrum.

Reverting to FIG. 2 the two parallel FTC filter stages 21 and 22 are followed by VM spectrum block 23 and averaging block or function 26 after stage 21, with conventional or VM spectrum block 24 and averaging block 27 after stage 22. A gain compensation step 27 with the velocity spectrum output 29, is provided in common after averaging blocks or functions 26 and 27. This is included to compensate for gain variations between the velocity components in the spectrum caused by the FTC-stage.

We claim:

1. Method for determining the velocity-time spectrum of blood flow in a living body by means of an ultrasonic pulsed wave Doppler system, comprising the steps of:

sequentially transmitting pulsed ultrasonic waves at a predetermined pulsed repetition frequency and receiving a corresponding sequence of echo signals, sampling the received echo signals at one or more predetermined time delays after transmitted ultrasonic pulses, and processing said sequence of echo signal samples by frequency spectrum analysis to obtain a blood velocity spectrum comprising a number of velocity components within a range of expected blood velocity values, and repeating said processing a plurality of times to obtain a velocity-time spectrum for substantially real-time display, wherein said sampling step comprises sampling, for each velocity component in said blood velocity spectrum, the received echo signals with subsequent increase or decrease in said predetermined delay after pulse transmission according to the change in round-trip time of the ultrasonic pulses reflected from blood moving with a velocity corresponding to each said velocity component, calculating some of said velocity components by conventional frequency spectrum analysis, whereby said signal samples are obtained with a constant delay after pulse transmission, and processing the resulting sequence of signal samples, to obtain said velocity component.

2. Method according to claim 1 further including the step of applying a smooth window function to said signal samples previous to said spectrum analysis processing.

3. Method according to claim 1, further including the step of processing said echo signals by a highpass filter to reject signals from stationary and slowly moving targets in said living body.

4. Method for determining the velocity-time spectrum of blood flow in a living body by means of an ultrasonic pulsed wave Doppler system, comprising the steps of:

sequentially transmitting pulsed ultrasonic waves and receiving a corresponding sequence of echo signals, sampling the received echo signals at one or more predetermined time delays after transmitted ultrasonic pulses, and processing said sequence of echo signal samples by frequency spectrum analysis to obtain a blood velocity spectrum comprising a number of velocity components within a range of expected blood velocity values, and repeating said processing a plurality of times to obtain a velocity-time spectrum for substantially real-time display, wherein said sampling step comprises sampling, for each velocity component in said blood velocity spectrum, the received echo signals with subsequent increase or decrease in said predetermined delay after pulse transmission according to the change in round-trip time of the ultrasonic pulses reflected from blood moving with a velocity corresponding to each said velocity component, processing the resulting sequence of signal samples, to obtain said velocity component, and using highpass filters with different cutoff frequencies for each of said velocity components in said blood velocity spectrum.

5. Method according to claim 1, further including the step of subjecting said echo signals to complex demodulation before said processing.

6. Method according to claim 1, further including the step of calculation of a plurality of blood velocity spectra with respect to different positions along the ultrasonic beam and different instances in time, and to average each velocity component of said plurality of blood velocity spectra.

7. Method according to claim 1, applying to said velocity components a gain compensation step in accordance with the characteristics of said high pass filtering.

* * * * *